(12) United States Patent
Schreter et al.

(10) Patent No.: US 11,320,854 B2
(45) Date of Patent: May 3, 2022

(54) TIME CALIBRATION ACROSS MULTI-SOCKET COMPUTING SYSTEMS

(71) Applicant: SAP SE, Walldorf (DE)

(72) Inventors: Ivan Schreter, Malsch (DE); Sergey Yurenev, Walldorf (DE)

(73) Assignee: SAP SE, Walldorf (DE)

( * ) Notice: Subject to any disclaimer, the term of this patent is extended or adjusted under 35 U.S.C. 154(b) by 218 days.

(21) Appl. No.: 16/837,508

(22) Filed: Apr. 1, 2020

(65) Prior Publication Data

US 2021/0311521 A1 Oct. 7, 2021

(51) Int. Cl.
*G06F 1/12* (2006.01)
*G06F 1/08* (2006.01)
*G06F 16/23* (2019.01)

(52) U.S. Cl.
CPC .................. *G06F 1/12* (2013.01); *G06F 1/08* (2013.01); *G06F 16/2379* (2019.01)

(58) Field of Classification Search
CPC ........... G06F 1/12; G06F 1/08; G06F 16/2379
See application file for complete search history.

(56) References Cited

U.S. PATENT DOCUMENTS

| | | | |
|---|---|---|---|
| 9,781,564 B2 * | 10/2017 | Ilyadis | .................. H04W 4/023 |
| 2007/0140127 A1 * | 6/2007 | Frei | ........................ H04J 3/0655 |
| | | | 370/238 |
| 2008/0126820 A1 * | 5/2008 | Fraser | ...................... G06F 1/12 |
| | | | 713/375 |
| 2018/0081720 A1 * | 3/2018 | Zlatanchev | .......... G06F 11/3476 |
| 2019/0171192 A1 * | 6/2019 | Nishiyama | .......... G06F 16/2379 |
| 2021/0328698 A1 * | 10/2021 | Lv | ........................... H04L 69/28 |

\* cited by examiner

*Primary Examiner* — Raymond N Phan
(74) *Attorney, Agent, or Firm* — Mintz Levin Cohn Ferris Glovsky and Popeo, P.C.

(57) ABSTRACT

A thread executing a task at a node in a multi-socket computing system may access a first data structure to obtain a first calibration dataset for the node. The first thread may generate a timestamp based on the first calibration dataset and a first quantity of time measured by a clock at the first node. The real-time duration of the task may be determined based on the timestamp. The first thread may recalibrate the first clock by at least generating, based on the first quantity of time measured by the clock and a second quantity of time measured by a wall clock of an operating system of the multi-socket computing system, a second calibration dataset. The first thread may update the first data structure to include the second calibration dataset while a second thread accesses a second data structure to obtain calibration data.

20 Claims, 5 Drawing Sheets

TIME CALIBRATION ACROSS MULTI-SOCKET COMPUTING SYSTEMS

TECHNICAL FIELD

The present disclosure generally relates to time synchronization and, more specifically, to time calibration across a multi-socket computing system.

BACKGROUND

To track the passage of time, a computing system may include a clock configured to measure system time, for example, by counting the quantity of central processing unit (CPU) ticks that have transpired from the start of the computing system. The quantity of elapsed system time may be used to measure the duration of various tasks executing on the computing system. For example, the system time measured by the clock may indicate the quantity of time required to execute at least a portion of a query execution plan implementing a database query and/or the individual query operations (e.g., join, select, order by, group by, and/or the like) included in the query execution plan. In doing so, the computing system may detect performance bottlenecks during development as well as in production. For instance, the computing system may identify, based at least on the quantity of elapsed system time, a query execution plan and/or a query operation that contribute to a suboptimal query response time.

SUMMARY

Methods, systems, and articles of manufacture, including computer program products, are provided for calibrating time across a multi-socket computing system. In one aspect, there is provided a system including at least one processor and at least one memory. The at least one memory can store instructions that cause operations when executed by the at least one processor. The operations may include: accessing, by a first thread executing a first task at a first node in a multi-socket computing system, a first data structure to obtain a first calibration dataset for the first node; generating, based at least on the first calibration dataset and a first quantity of time measured by a first clock at the first node, a first timestamp; recalibrating, by the first thread, the first clock at the first node, the recalibrating includes generating, based at least on the first quantity of time measured by the first clock and a second quantity of time measured by a wall clock of an operating system of the multi-socket computing system, a second calibration dataset; and updating the first data structure to include the second calibration dataset for the first node.

In some variations, one or more of the features disclosed herein including the following features can optionally be included in any feasible combination. The first thread may obtain a lock prior to updating the first data structure. The lock may prevent a second thread from simultaneously updating the first data structure.

In some variations, a second thread executing a second task at the first node may access a second data structure to obtain the first calibration dataset for the first node. The second node may generate, based at least on the first calibration dataset and a third quantity of time measured by the first clock at the first node, a second timestamp.

In some variations, the second thread may recalibrate the first clock at the first node by at least determining a third calibration dataset. The second data structure may be updated instead of the first data structure to include the third calibration dataset for the third node.

In some variations, the second thread may access the second data structure while the first thread is updating the first data structure to include the second calibration dataset.

In some variations, the first timestamp may be generated at a start of the first task. A real time duration of the first task may be determined based at least on the first timestamp and a second timestamp generated at an end of the first task.

In some variations, the second calibration dataset may describe a relationship between the second quantity of time measured by the wall clock and the first quantity of time.

In some variations, the first quantity of time may be in a first unit of time including a quantity of central processing unit (CPU) ticks. The second quantity of time may be in a second unit of time including a quantity of nanoseconds.

In some variations, the first thread may perform the recalibration at a time determined as part of a previous recalibration of the first clock. A calibration interval between successive recalibrations may be increased until a threshold value.

In some variations, a second timestamp may be generated subsequent to generating of the first timestamp. Whether the second timestamp is less than the first timestamp may be determined. The first timestamp may be returned instead of the second timestamp in response to the second timestamp being less than the first timestamp.

In some variations, the first data structure may further include a third calibration dataset for a second node in the multi-socket computing system.

In some variations, the first data structure may be an array storing the first calibration dataset and/or the second calibration dataset. The first calibration dataset and/or the second calibration dataset may be associated with a socket identifier of the first node.

In another aspect, there is provided a method for calibrating time across a multi-socket computing system. The method may include: accessing, by a first thread executing a first task at a first node in a multi-socket computing system, a first data structure to obtain a first calibration dataset for the first node; generating, based at least on the first calibration dataset and a first quantity of time measured by a first clock at the first node, a first timestamp; recalibrating, by the first thread, the first clock at the first node, the recalibrating includes generating, based at least on the first quantity of time measured by the first clock and a second quantity of time measured by a wall clock of an operating system of the multi-socket computing system, a second calibration dataset; and updating the first data structure to include the second calibration dataset for the first node.

In some variations, one or more of the features disclosed herein including the following features can optionally be included in any feasible combination. The first thread may obtain a lock prior to updating the first data structure. The lock may prevent a second thread from simultaneously updating the first data structure.

In some variations, the method may further include: accessing, by the second thread executing a second task at the first node, a second data structure to obtain the first calibration dataset for the first node, the second thread accessing the second data structure while the first thread is updating the first data structure to include the second calibration dataset; generating, by the second thread, a second timestamp, the second timestamp being generated based at least on the first calibration dataset and a third quantity of time measured by the first clock at the first node; recalibrating, by the second thread, the first clock at the first node by at least determining, a third calibration dataset; and updating a second data structure instead of the first data structure to include the third calibration dataset for the first node.

In some variations, the first timestamp may be generated at a start of the first task. A real time duration of the first task may be determined based at least on the first timestamp and second timestamp generated at an end of the first task.

In some variations, the second calibration dataset may describe a relationship between the second quantity of time measured by the wall clock and the first quantity of time. The first quantity of time may be in a first unit of time including a quantity of central processing unit (CPU) ticks. The second quantity of time may be in a second unit of time including a quantity of nanoseconds.

In some variations, the first thread may perform the recalibration at a time determined as part of a previous recalibration of the first clock. A calibration interval between successive recalibrations may increase until a threshold value.

In some variations, the method may further include: generating a second timestamp subsequent to generating the first timestamp; determining whether the second timestamp is less than the first timestamp; and returning wherein the first timestamp instead of the second timestamp in response to the second timestamp being less than the first timestamp.

In another aspect, there is provided a computer program product that includes a non-transitory computer readable medium. The non-transitory computer readable medium may store instructions that cause operations when executed by at least one data processor. The operations may include: accessing, by a first thread executing a first task at a first node in a multi-socket computing system, a first data structure to obtain a first calibration dataset for the first node; generating, based at least on the first calibration dataset and a first quantity of time measured by a first clock at the first node, a first timestamp; recalibrating, by the first thread, the first clock at the first node, the recalibrating includes generating, based at least on the first quantity of time measured by the first clock and a second quantity of time measured by a wall clock of an operating system of the multi-socket computing system, a second calibration dataset; and updating the first data structure to include the second calibration dataset for the first node.

Implementations of the current subject matter can include methods consistent with the descriptions provided herein as well as articles that comprise a tangibly embodied machine-readable medium operable to cause one or more machines (e.g., computers, etc.) to result in operations implementing one or more of the described features. Similarly, computing systems are also described that may include one or more processors and one or more memories coupled to the one or more processors. A memory, which can include a non-transitory computer-readable or machine-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including, for example, to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to time calibration across multi-socket computing systems, it should be readily understood that such features are not intended to be limiting. The claims that follow this disclosure are intended to define the scope of the protected subject matter.

DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

Figure 1:
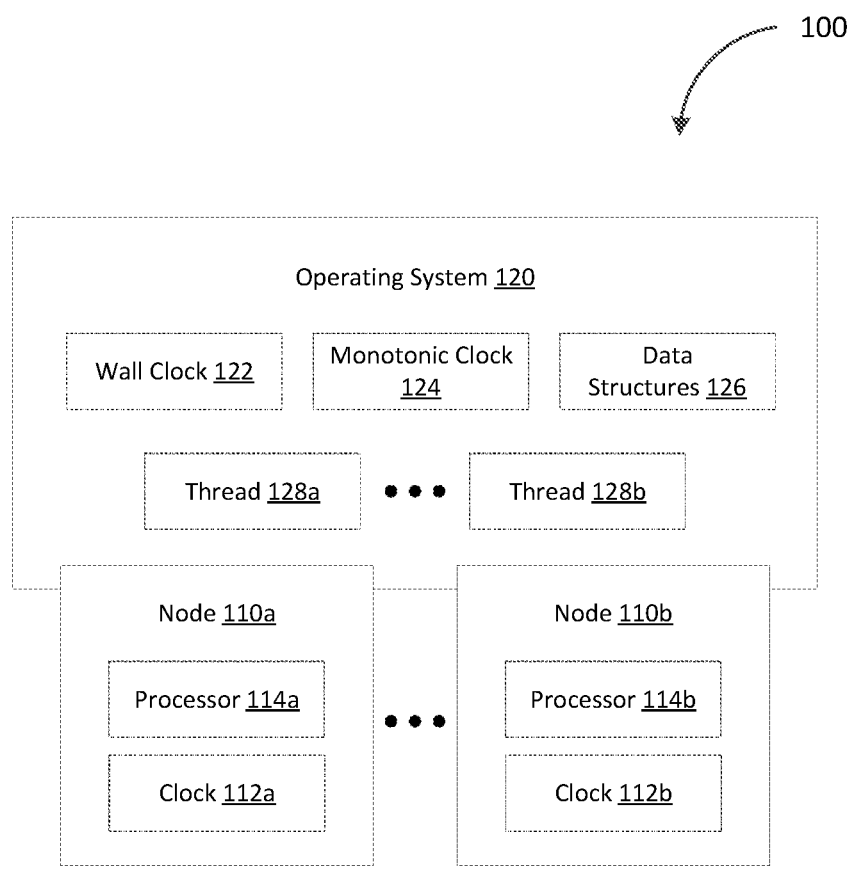
FIG. 1 depicts a system diagram illustrating a multi-socket computing system, in accordance with some example embodiments.

When practical, like labels are used to refer to same or similar items in the drawings.

DETAILED DESCRIPTION

A computing system may determine, based on system time, the duration of various tasks executing on the computing system including, for example, query execution plans implementing database queries and/or the individual query operations (e.g., join, select, order by, group by, and/or the like) included in each query execution plan. In a multi-socket computing system having multiple nodes (e.g., non-uniform memory access (NUMA) nodes), each node may include its own processor and clock (e.g., crystal oscillator and/or the like). Discrepancies between the frequency of the clock on each node in the multi-socket computing system may prevent its operating system from quickly determining the duration of tasks that are being executed by multiple computing threads across multiple nodes. Moreover, using the clock at the computing system to perform timekeeping, which requires making one or more system calls, may consume excess time and impose unnecessary delays when determining execution time. Timekeeping in the multi-socket computing system may be further complicated by changes in the nodes executing a task triggered, for example, by topographical changes in the multi-socket computing system (e.g., addition and/or removal of nodes).

In some example embodiments, the clock at each node in a multi-socket computing system may be calibrated relative to real time such that for the most requests the real time duration of a task executed at a node may be determined without having to obtain one or more timestamps from a wall clock of the operating system, which may be a clock configured to track a real time at the operating system. For example, calibrating a first clock at a first node in the multi-socket computing system may include determining a first calibration dataset for the first node while calibrating a second clock at a second node in the multi-socket computing system may include determining a second calibration dataset for the second node. Each calibration dataset may describe a line equation reflecting a dependency between a first unit (e.g., nanoseconds and/or the like) associated with the wall clock of the operating system and a second quantity of time in a second unit associated with the clock at each node in the multi-socket computing system (e.g., CPU ticks and/or the like). The duration of a task executed at the first node and/or the second node may be determined based at least on the first calibration dataset and/or the second calibration dataset. Determining the duration of the task in this manner may be faster than determining the duration of the task by obtaining one or more timestamps from the wall clock of the operating system.

In some example embodiments, the first calibration dataset and the second calibration dataset may be stored in a data structure (e.g., an array and/or the like), which may be updated when the first clock at the first node and/or the second clock at the second node undergo recalibration. For example, a first thread executing a first task at the first node and/or the second node may recalibrate the first clock and/or the second clock. The recalibration may include determining a third calibration dataset for the first node and/or a fourth calibration dataset for the second node. The third calibration dataset may be more accurate than the first calibration dataset and the fourth calibration dataset may be more accurate than the second calibration dataset at least because the third calibration dataset and the fourth calibration dataset may be computed over a longer calibration interval. Furthermore, the recalibration may include updating the data structure by replacing the first calibration dataset in the data structure with the third calibration dataset and/or replacing the second calibration dataset in the data structure with the fourth calibration dataset.

In some example embodiments, the data structure may be subject to a write lock in order to preserve the consistency of the calibration data included in the data structure. Moreover, multiple copies of the data structure may be maintained at the multi-socket computing system in order to support concurrent access to the calibration data included in the data structure. For example, in order to update the data structure as part of recalibrating the first clock and/or the second clock, the first thread may obtain a lock that prevents other threads from also updating the data structure. Moreover, upon obtaining the lock, the first thread may update a first copy of the data structure while a second thread executing a second task at the first node may access a second copy of the data structure in order to obtain, for example, calibration data for the first node. The second thread may access the second copy of the data structure without waiting, for example, for the first thread to release the lock. As such, the second thread may determine the duration of the second task in a lock-free manner.

FIG. 1 depicts a system diagram illustrating an example of a multi-socket computing system 100, in accordance with some example embodiments. Referring to FIG. 1, the multi-socket computing system 100 may include a plurality of nodes, each of which including a clock and at least one processor. For example, the example of the multi-socket computing system 100 shown in FIG. 1 includes a first node 110a and a second node 110b. The first node 110a may include a first clock 112a and a first processor 114a while the second node 110b may include a second clock 112b and a second processor 114b.

Furthermore, as shown in FIG. 1, the multi-socket computing system 100 may include an operating system 120, which may be configured to coordinate the execution of one or more tasks across the first node 110a, the second node 110b, and/or the like. It should be appreciated that the operating system 120 may be communicatively coupled with the first node 110a and the second node 110b via a wired connection and/or a wireless connection. For instance, the operating system 120, the first node 110a, and the second node 110b may be coupled via a wired network and/or wireless network including, for example, a wide area network (WAN), local area network (LAN), a virtual local area network (VLAN), the Internet, and/or the like.

In some example embodiments, the clock at each node in the multi-socket computing system 100 may be calibrated relative to real time such that the real time duration of a task executed at a node may be determined without having to obtain one or more timestamps from a wall clock 122 of the operating system 120. For example, calibrating the first clock 112a at the first node 110a in the multi-socket computing system 100 may include determining a first calibration dataset $C_1$ for the first node 110a while calibrating the second clock 112b at the second node 110b in the multi-socket computing system 100 may include determining a second calibration dataset $C_2$ for the second node 110b. Subsequent time requests within calibration interval may be obtained using, for example, the first calibration dataset $C_1$ and/or the second calibration dataset $C_2$ instead of computing new calibration datasets for the first node 110a and/or the second node 110b.

Table 1 below depicts programming code implementing the timer state that is associated with each node in the multi-socket computing system 100. It should be appreciated that the values associated with timer state may be integers of sufficient bit size to prevent overflow. The quantities of the time measured by the clocks at the nodes (e.g., the first clock 112a at the first node 110a, the second clock 112b at the second node 110b, and/or the like) may be in a different unit of time than the quantities of time measured by the wall clock 122 of the operating system 120. A multiplier may be applied to the quantities of time measured by the clocks at the nodes in order to convert these values to a $2^n$ multiple of the values measured by the wall clock 122. In doing so, timestamps and calibration datasets may be determined by performing integer operations, which may be more time and resource efficient than the corresponding floating-point operations.

TABLE 1

```
struct timepoint
{
    int monotonic_timestamp;
    int wallclock_timestamp;
    int socket_id;
    int ticks;
};
struct socket_state
{
    timepoint base;
    int next_calibration_ticks;
    int multiplicator;
    bool fallback_active;
};
```

The first calibration dataset $C_1$ and the second calibration dataset $C_2$ may each describe a line equation reflecting a dependency between a first quantity of time in a first unit (e.g., nanoseconds and/or the like) associated with the wall clock 122 of the operating system 120 and a second quantity of time in a second unit associated with the clock at each node in the multi-socket computing system 100 (e.g., CPU ticks and/or the like). The duration of a task executed at the first node 110a and/or the second node 110b may be determined based at least on the first calibration dataset $C_1$ and/or the second calibration dataset $C_2$.

Figure 2:
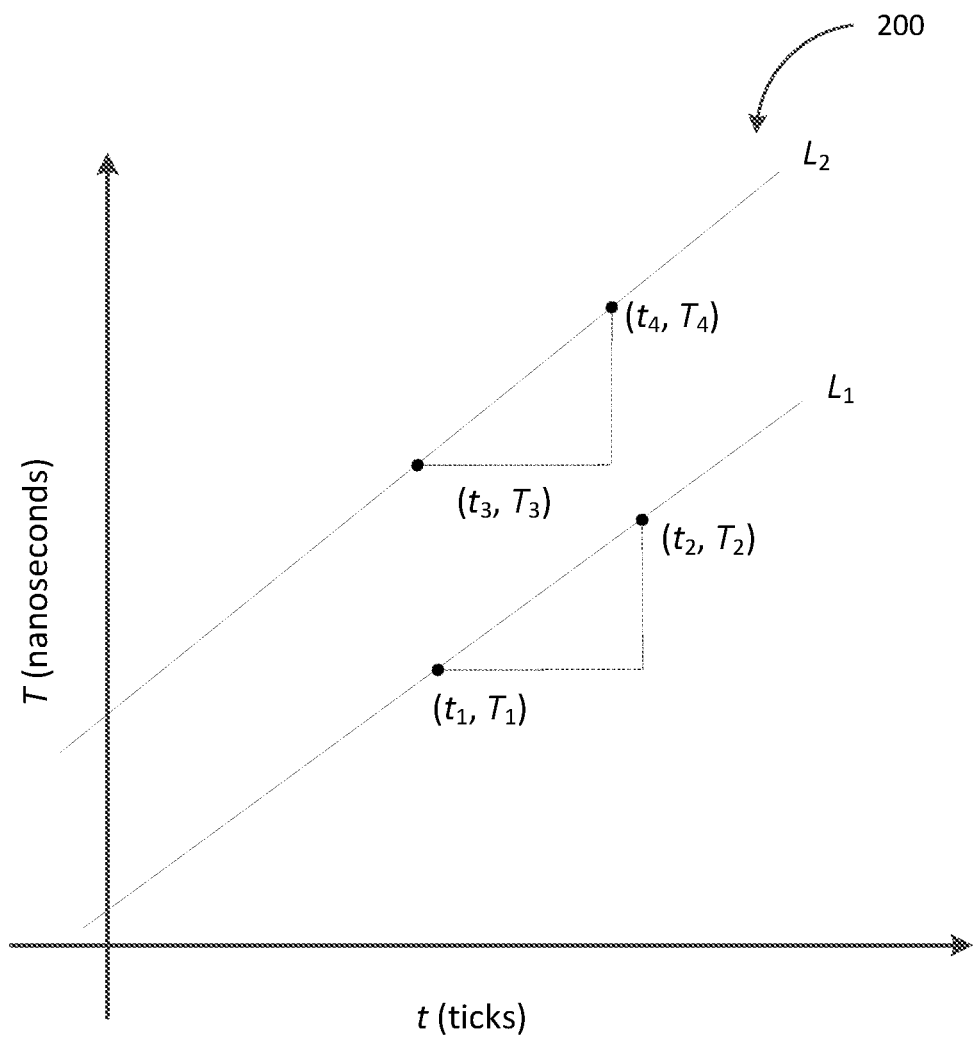
FIG. 2 depicts a graph illustrating a relationship between real time and a time measured at individual nodes in a multi-socket computing system, in accordance with some example embodiments.

To further illustrate, FIG. 2 depicts a graph 200 illustrating the relationship between real time and a time measured at individual nodes in a multi-socket computing system, in accordance with some example embodiments. Referring to FIG. 2, the calibration dataset for the clock at each node may correspond to a slope and an intercept of a line interconnecting two measurement points. For example, the first calibration dataset $C_1$ may correspond to a first line $L_1$ interconnecting a first measurement point $(t_1, T_1)$ and a second measurement point $(t_2, T_2)$. That is, the first calibration dataset $C_1$ may correspond to a ratio $m_1$ between a first quantity of time (e.g., a $T_2-T_1$ quantity of nanoseconds) measured by the wall clock 122 and a second quantity of time (e.g., a $t_2-t_1$ quantity of CPU ticks) measured by the first clock 112a, and an addend $b_1$ equal to $T_2-m_1 \times t_2$. Instead of requiring one or more real time measurements from the wall clock 122, real time duration of a task executed at the first node 110a may be determined based on the first calibration dataset $C_1$ and one or more measurements from the first clock 112a.

Meanwhile, the second calibration dataset $C_2$ may correspond to a second line $L_2$ interconnecting a third measurement point $(t_3, T_3)$ and a fourth measurement point $(t_4, T_4)$. Accordingly, the second calibration dataset $C_2$ may correspond to a ratio between a third quantity of time (e.g., a $T_4-T_3$ quantity of nanoseconds) measured by the wall clock 122 and a fourth quantity of time (e.g., a $t_4-t_3$ quantity of CPU ticks) measured by the second clock 112b, and an addend $b_2$ equal to $T_4-m_2 \times t_4$. The real time duration of a task executed at the second node 110b may be determined without one or more real time measurements from the wall clock 122. Instead, the real time duration of the task executed at the second node 110b may be determined based on the second calibration dataset $C_2$ and one or more measurements from the second clock 112b.

Table 2 below depicts programming code implementing a routine for generating a real time timestamp indicative of a current time. A thread executing a task at one or more nodes in the multi-socket computing system 100 may invoke the routine to generate a first timestamp at a start of the task and a second timestamp at an end of the task in order to determine, based at least on a difference between the first timestamp and the second timestamp, a real time duration of the task executed at the one or more nodes. It should be appreciated that the routine may return a timestamp or a value indicating a retry request, which may occur when the thread moves to a different node during the routine.

TABLE 2

```
int current_time_ll( )
{
    retry:
        (socket_id, ticks) = get_socket_id_and_ticks( );
        socket_state& s = sockets[socket_id];
```

TABLE 2-continued

```
        if (ticks >= s.next_calibration_ticks) {
            int time = recalibrate(socket_id);
            if (time != 0)
                return time;
            else
                goto retry;
        }
        return s.base.wallclock_timestamp + (((s.multiplicator *
            (ticks - s.base.ticks)) >> n);
}
```

Table 3 depicts programming code implementing a routine for calibrating the clock at a node in a multi-socket computing system relative to a real time. A thread executing a task at one or more nodes may invoke the routine to recalibrate at a frequency that is determined by the length of the calibration interval, which may correspond to a length of time between two measurement points. For example, the calibration interval may be shorter in the beginning when only a small quantity of time has transpired.

A shorter calibration interval may trigger more frequent recalibrations in order to increase the accuracy of the calibration datasets. Moreover, the calibration datasets generated over a too short calibration interval may not be sufficiently accurate. As such, when the calibration interval is below a threshold length, the thread may use timestamps generated directly by the wall clock 122. As the calibration interval increases, recalibration may become less frequent. For instance, as shown in Table 3, the routine may determine a time to a next recalibration (e.g., a quantity of time between successive calibrations), which may double for every calibration until a threshold value (e.g., a maximum value and/or the like).

TABLE 3

```
int recalibrate(int socket_id)
{
    timepoint tp = get_current_timepoint( );
    if (tp.socket_id != socket_id)
        return 0; // retry - thread moved to a different socket
    socket_state& s = sockets[socket_id];
    if (s.fallback_active)
        return tp.wallclock_timestamp; // use system time a fallback
    if (s.base.wallclock_timestamp == 0) {
        s.base = tp; // first call - no calibration data yet
        return tp.wallclock_timestamp;
    }
    if (tp.monotonic_timestamp < s.base.monotonic_timestamp ||
tp.ticks < s.base.ticks) {
        // error: time goes back
        activate_fallback(s);
        return tp.wallclock_timestamp;
    }
    if (tp.monotonic_timestamp - base.monotonic_timestamp <
MIN_TIMESTAMP_DELTA) {
        // no sufficient calibration interval - slow path via system timer
        return tp.wallclock_timestamp;
    }
    // compute the slope
    s.multiplicator = ((tp.monotonic_timestamp -
s.base.monotonic_timestamp) << n) / (tp.ticks - s.base.ticks);
    // adjust starting wall clock time timestamp from time difference
    s.base.wallclock_timestamp = tp.wallclock_timestamp -
(((tp.ticks - s.base.ticks) * s.multiplicator) >> n);
    // compute next calibration time
    s.next_calibration_ticks = 2 * (tp.ticks - s.base.ticks);
    if (s.next_calibration_ticks > s.base.ticks + MAX_TICK_DELTA)
        s.next_calibration_ticks = s.base.ticks +
            MAX_TICK_DELTA;
    return tp.wallclock_timestamp;
}
```

Imprecision at the first clock 112a, the second clock 112b, and the wall clock 122 as well as discrepancies in calibration across different clocks may lead to anachronistic timestamps (e.g., a timestamp for an earlier time). For example, the imprecision may be introduced by the operating system 120 calibrating the wall clock 122 against an external source or by insufficiently long calibration intervals. The wall clock 122 may also be set backwards, for example, by a network time protocol daemon during a reset of the operating system 120.

Table 4 below depicts programming code implementing a routine for preventing the generation of inconsistent timestamps. As shown in Table 4, the thread may disregard a timestamp that is less than a previous timestamp and keep the previous timestamp instead. In doing so, the thread may avoid using anachronistic timestamps that decrease over time. Alternatively, inconsistent timestamps such as anachronistic timestamps may be avoided by using time measured by a monotonic clock 124 included in the operating system 120. The monotonic clock 124 cannot be set to move backwards in time and may thus provide a more reliable measurement of time than the wall clock 122.

TABLE 4

```
int current_time( )
{
    static thread_local int last_time = 0;
    int time = current_time_ll( );
    if (time <= last_time) {
        return last_time; // prevent time going back
    } else {
        last_time = time;
        return time;
    }
}
```

The first node 110a and/or the second node 110b may return an incorrect time measurement (e.g., quantity of CPU ticks) from the first clock 112a and/or the second clock 112b due, for example, to a firmware defect, a basic system input/output (BIOS) error, and/or the like. Accordingly, a thread that is performing a calibration based on a time measurement from the first node 110a and/or the second node 110b may be configured to fall back to a time measurement from the wall clock 122 in response to detecting one or more inconsistencies in the time measurement provided by the first node 110a and/or the second node 110b.

Table 5 below depicts programming code implementing a routine for setting a node to fallback to a time measurement from the wall clock 122 at the operating system 120. As shown in Table 5, fallback mode may be triggered for the first node 110a and/or the second node 110b, after which point the thread may use time measurements provided by the wall clock 122 of the operating system 120 instead of time measurements from the first clock 112a at the first node 120a and/or the second clock 112b at the second node 110b. Fallback mode for the first node 110a and/or the second node 110b may be triggered by a variety of conditions including, for example, time measurements from the first node 110a and/or the second node 110b that changes the corresponding first calibration dataset $C_1$ and/or the second calibration dataset $C_2$ by more than a threshold quantity (e.g., 20% or a different quantity). Moreover, as shown in Table 4, triggering a fallback mode at the first node 110a and/or the second node 110b may also force a recalibration of the first clock 112a at the first node 110a and/or the second clock 112b at the second node 110b.

TABLE 5

```
void activate_fallback(socket_state& s)
{
    s.fallback_active = true;
    s.next_calibration_ticks = 0;   // to force "recalibration" each time
}
```

In some example embodiments, the operating system 120 may maintain one or more data structures 126 (e.g., arrays and/or the like) for storing a calibration dataset for each of the nodes included in the multi-socket computing system 100 such as the first calibration dataset $C_1$ for the first node 110a and the second calibration dataset $C_2$ for the second node 110b. Each calibration dataset may be stored with a socket identifier of the corresponding node. For instance, the first calibration dataset $C_1$ may be stored with a first socket identifier of the first node 110a and the second calibration dataset $C_2$ may be stored with a second socket identifier of the second node 110b. The one or more data structures 126 may be updated when the first clock 112a at the first node 110a and/or the second clock 112b at the second node 110b undergo recalibration.

For example, referring again to FIG. 1, a first thread 128a executing a first task at the first node 110a and/or the second node 110b may recalibrate the first clock 112a and/or the second clock 112b. Alternatively and/or additionally, a second thread 128b executing a second task at the first node 110a and/or the second node 110b may also recalibrate the first clock 112a and/or the second clock 112b. Each of the first thread 128a and the second thread 128b may be a sequence of programmed instructions that can be managed independently by the operating system 120, for example, a scheduler at the operating system 120. The first thread 128a and the second thread 128b may be components different processes running in the operating system 120. Alternatively, the first thread 128a and the second thread 128b may exist with a single process and may execute concurrently while sharing resources such memory.

The recalibration may include determining a third calibration dataset $C_3$ for the first node 110a and/or a fourth calibration dataset $C_4$ for the second node 110b. The third calibration dataset $C_3$ may be more accurate than the first calibration dataset $C_1$ and the fourth calibration dataset $C_4$ may be more accurate than the second calibration dataset $C_2$ at least because the third calibration dataset $C_3$ and the fourth calibration dataset $C_4$ may be computed over a longer calibration interval. Furthermore, the recalibration may include updating the one or more data structures 126 by replacing the first calibration dataset $C_1$ with the third calibration dataset $C_3$ and/or replacing the second calibration dataset $C_2$ with the fourth calibration dataset $C_4$.

In order to provide concurrent access while maintaining the consistency of the calibration data, the one or more data structures 126 may include at least a first data structure 126a and a second data structure 126b. In some example embodiments, the one or more data structures 126 may include the first data structure 126a, the second data structure 126b as well as a third data structure 126c and/or a fourth data structure 126d. Write access to the one or more data structures 126 may be controlled by a lock. For example, in order to update the one or more data structures 126 as part of recalibrating the first clock 112a and/or the second clock 112b, the first thread 128a may obtain the lock to prevent other threads from also updating the one or more data structures 126. However, it should be appreciated that even while the first thread 128a holds the lock on the one or more data structures 126, other threads may nevertheless be able to read from the one or more data structures 126 and determine the duration of one or more tasks without waiting for the first thread 128a to release the lock. Moreover, upon obtaining the lock, the first thread 128a may update the one or more data structures 126 in a round-robin fashion.

Figure 3:
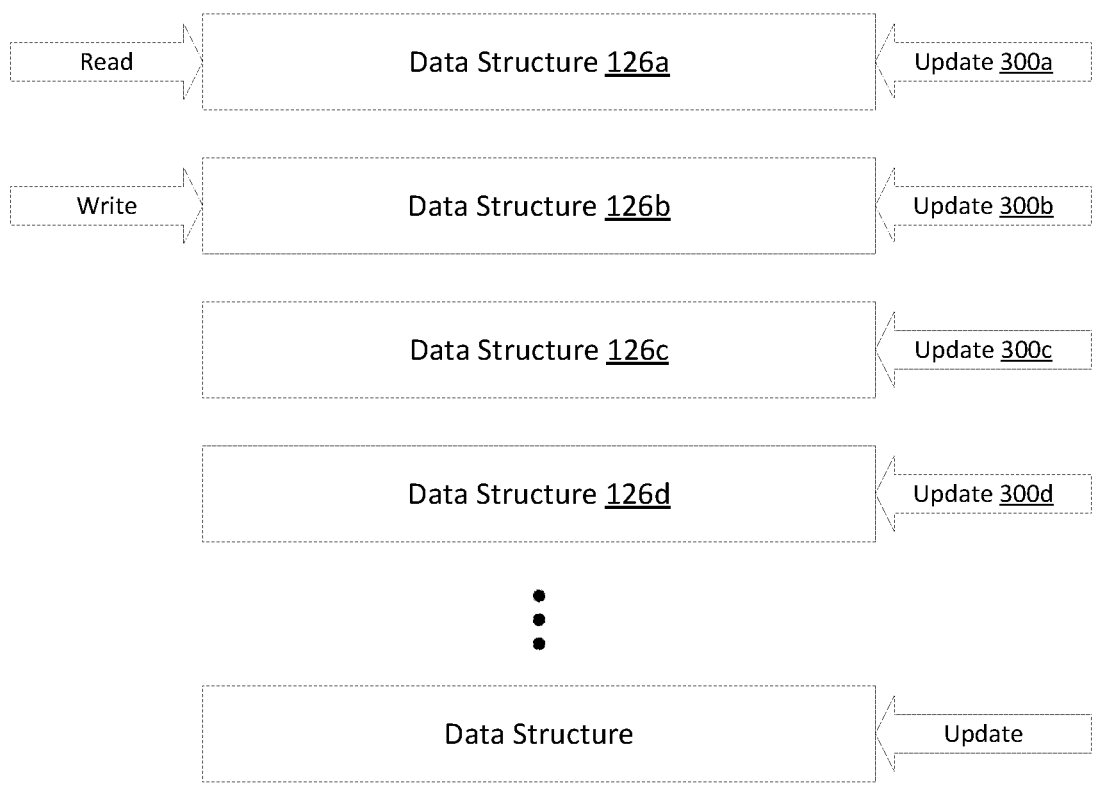
FIG. 3 depicts an example of multi-threaded access to calibration data, in accordance with some example embodiments.

To further illustrate, FIG. 3 depicts an example of multi-threaded access to calibration data, in accordance with some example embodiments. As shown in FIG. 3, obtaining the lock may provide the first thread 128a with write access to the data structure 126b while the second thread 128b executing the second task at the first node 110a and/or the second node 110b may have read access to the second data structure 126a. That is, the first thread 128a may update the data structure 126b while the second thread 128b may access the second data structure 126a in order to obtain calibration data for the first node 110a and/or the second node 110b. It should be appreciated that the second thread 128b may operate based on outdated calibration data from the data structure 126a while the data structure 126b is being updated to include more recent calibration data.

Moreover, as shown in FIG. 3, the one or more data structure 126 may be updated in a round-robin fashion. For instance, after the first thread 128a applies a first update 300a to the first data structure 126a, subsequent updates to the one or more data structures 126 may be applied to the second data structure 126b, the third data structure 126c, and the fourth data structure 126d before returning to the first data structure 126a. For example, a second update 300b may be applied to the second data structure 126b followed by a third update 300c to the third data structure 126c and a fourth update 300d to the fourth data structure 126d. As noted, the first thread 128a (or another thread) may be required to obtain a lock in order to update, for example, the first data structure 126a. While the lock may prevent other threads from simultaneously updating the first data structure 126a, the other threads may have read access to the other data structures. For instance, while the first thread 128a is updating the data structure 126b, the second thread 128b may access the data structure 126a to obtain the calibration data stored therein.

When one of the one or more data structures 126 is being updated, an atomic variable pointing to the current data structure may change, thus switching the current structure. For instance, while the first thread 128a is updating the second data structure 126b, the atomic index of the second data structure 126b may be 0, indicating that the first data structure 126a should be accessed by the other threads (e.g., the second thread 128b). When the first thread 128a finishes updating the second data structure 126b, the atomic index may be incremented, for example, to 1, to point subsequent read accesses to the second data structure 126b. The next update of the one or more data structures 126 may be performed by the first thread 128a or the second thread 128b on the third data structure 126c. While the third data structure 126c is being updated, the other threads may follow the atomic index and read from the second data structure 126b. Once the update of the third data structure 126c is complete, the atomic index may once again be incremented, for example, to 2, to point subsequent read accesses to the third data structure 126c while the fourth data structure 126d is undergoing the next update. As in a round-robin fashion, after the fourth data structure 126d is updated, the next update may again be applied to the first data structure 126a.

Figure 4:
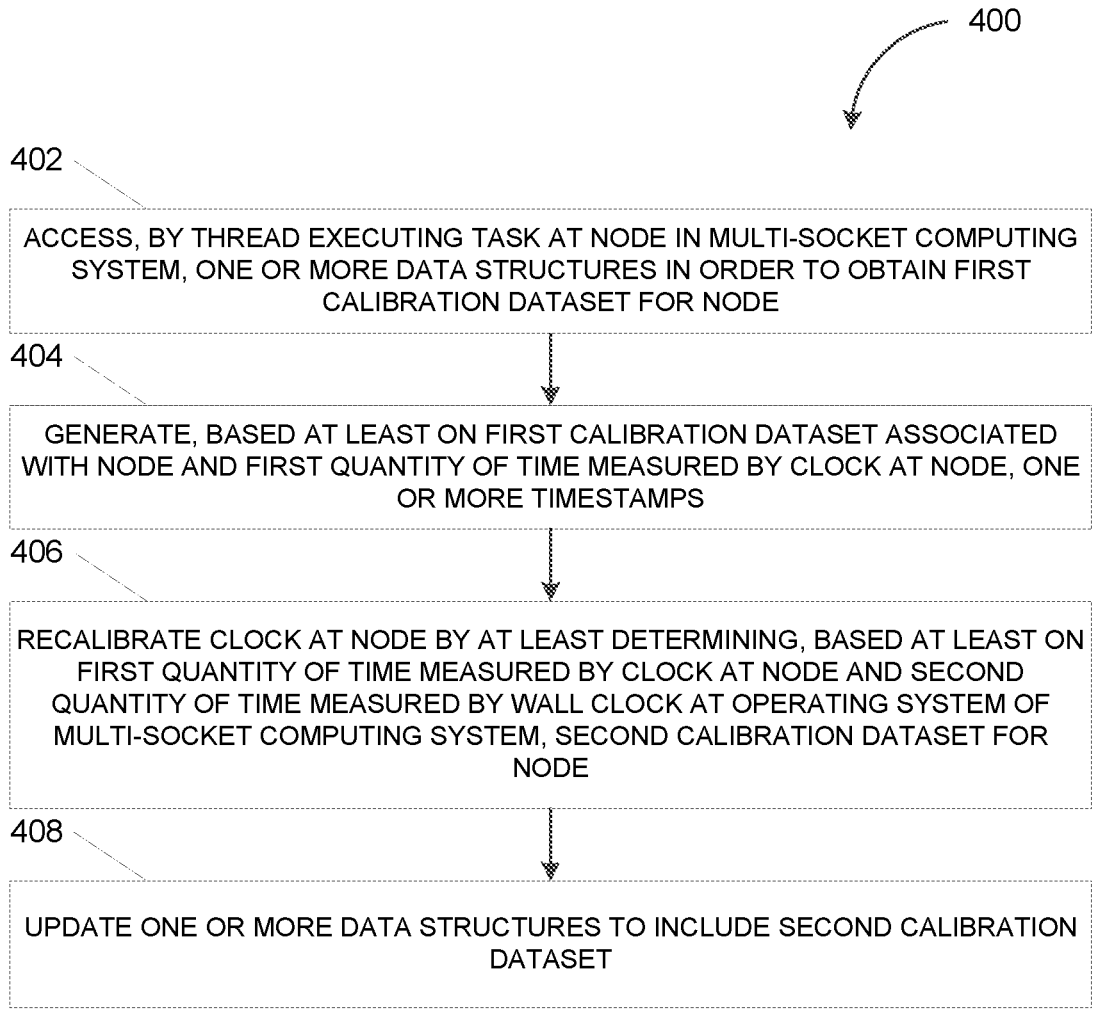
FIG. 4 depicts a flowchart illustrating a process for calibrating time in a multi-socket computing system, in accordance with some example embodiments.

FIG. 4 depicts a flowchart illustrating an example of a process 400 for calibrating time in the multi-socket computing system 100, in accordance with some example embodiments. Referring to FIGS. 1-4, the process 400 may be performed by a thread executing a task at one or more nodes in the multi-socket computing system 100 such as, for example, the first thread 128a, the second thread 128b, and/or the like.

At 402, a thread executing a task at a node in the multi-socket computing system 100 may access one or more data structures in order to obtain a first calibration dataset for the node. For example, the first thread 128a may be executing a task at the first node 110a in the multi-socket computing system 100. The task may include a query execution plan implementing a database query and/or one or more individual query operations (e.g., join, select, order by, group by, and/or the like) included in the query execution plan. The first thread 128a may be required to determine a duration of the task, for example, in real time. Accordingly, the first thread 128a may access the one or more data structures 126a at the operating system 120 in order to obtain, for example, the first calibration dataset $C_1$ for the first node 110a.

Obtaining the first calibration dataset $C_1$ for the first node 110a may enable the first thread 128a to determine the real-time duration of the task executed at the first node 110a using quantities of time measured by the first clock 112a at the first node 110a instead of the wall clock 122 (or the monotonic clock 124) at the operating system 120. Moreover, the first thread 128a may access the first data structure 126a to obtain the first calibration dataset $C_1$ even while the second thread 128b is accessing the second data structure 126b to update the first calibration dataset $C_1$. The first thread 128a may determine, based at least on the first calibration dataset $C_1$ and the quantities of time measured by the first clock 112a, a first timestamp at a start of the task and a second timestamp at an end of the task. Moreover, the first thread 128a may determine, based at least on a difference between the first timestamp and the second timestamp, the real time duration of the task executed at the first node 110a.

At 404, the thread may generate, based at least on the first calibration dataset associated with the node and a first quantity of time measured by a clock at the node, one or more timestamps. For example, as shown in FIG. 2, the first calibration dataset $C_1$ may correspond to the first line $L_1$ interconnecting the first measurement point ($t_1$, $T_1$) and the second measurement point ($t_2$, $T_2$). That is, the first calibration dataset $C_1$ may correspond to the relation between a quantity of time (e.g., a $T_2-T_1$ quantity of nanoseconds) measured by the wall clock 122 and a quantity of time (e.g., a $t_2-t_1$ quantity of CPU ticks) measured by the first clock 112a at the first node 110a. Accordingly, the real time duration of the task executed at the first node 110a may be determined without requesting one or more time measurements made by the wall clock 122 (or the monotonic clock 124) at the operating system 120. Instead, the real time duration of the task executed at the first node 110a may be determined based on the first calibration dataset $C_1$ and the first quantity of time (e.g., a quantity of CPU ticks) measured by the first clock 112a.

At 406, the thread may recalibrate the clock at the node by at least determining, based at least on the first quantity of time measured by the clock at the node and a second quantity of time measured by a wall clock at an operating system of the multi-socket computing system 100, a second calibration dataset for the node. In some example embodiments, each recalibration of the first clock 112a may include determining a time for a next recalibration of the first clock 112a. Accordingly, in addition to generating the one or more timestamps, the first thread 128a may also recalibrate the first clock 112a at the first node 110a if the first thread 128a determines that it is time to perform a recalibration of the first clock 112a. It should be appreciated that the time between successive recalibrations of the first clock 112a may increase, for example, by doubling at each recalibration until a threshold value such that recalibrations may occur at a lesser frequency over time.

In some example embodiments, recalibrating the first clock 112a may include determining the third calibration dataset $C_3$ for the first node 110a. Referring again to FIG. 2, the third calibration dataset $C_3$ may also be the line interconnecting two measurement points. The third calibration dataset $C_3$ may, as noted, be more accurate than the first calibration dataset $C_1$ at least because the third calibration dataset $C_3$ may be computed over a longer calibration interval.

At 408, the thread may update the one or more data structures to include the second calibration dataset for the node. In some example embodiments, write access to the one or more data structures 126 may require a lock to prevent multiple threads from simultaneously modifying the one or more data structures 126. Accordingly, the first thread 128a may obtain a lock in order to update the data structure 126b to include the third calibration dataset $C_3$. While the first thread 128a is updating the data structure 126b, the data structure 126a (as well as the third data structure 126c and/or the fourth data structure 126d, for example, for keeping a history of calibrations) may remain accessible to the second thread 128b to obtain calibration data. As shown in FIG. 3, the updating of the one or more data structures 126 may be performed in a round-robin fashion. For example, the first thread 128a may update, as part of the first not initial update 300b, the first data structure 126b to include the third calibration dataset $C_3$. Subsequent updates, such as the second update 300c, the third update 300d, and the fourth update 300a, may be applied to the data structure 126c, the data structure 126d, and the data structure 126a respectively.

Figure 5:
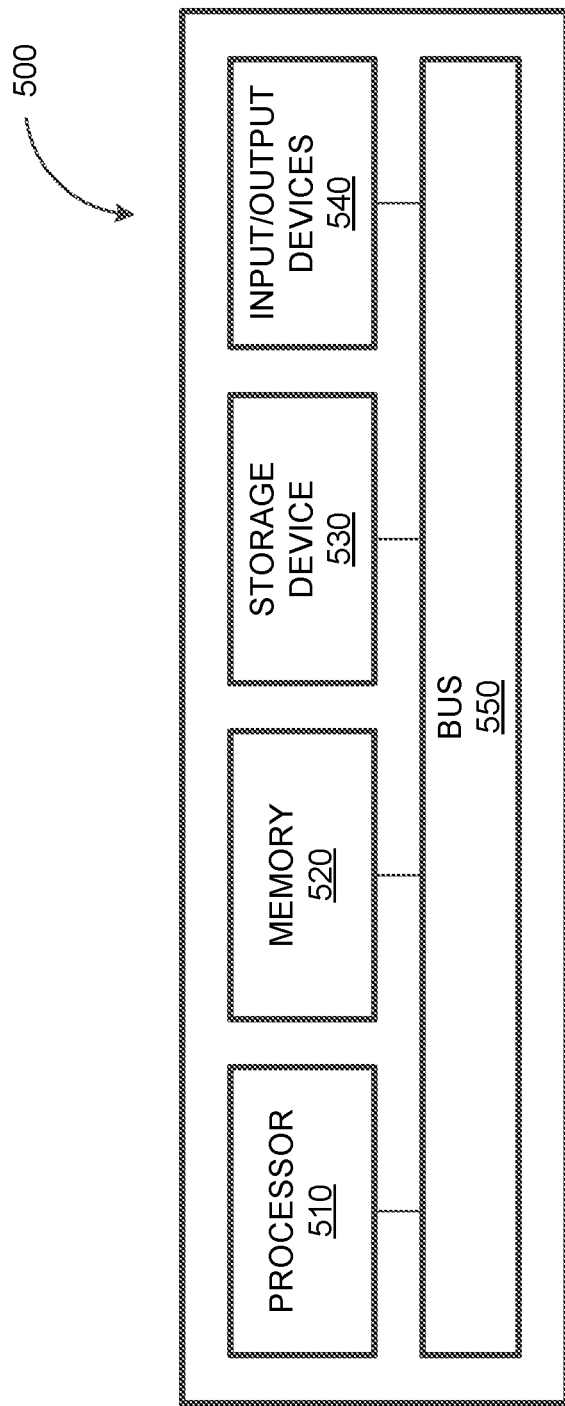
FIG. 5 depicts a block diagram illustrating an example of a computing system, in accordance with some example embodiments.

FIG. 5 depicts a block diagram illustrating a computing system 500 consistent with implementations of the current subject matter. Referring to FIGS. 1-5, the computing system 500 can be used to implement the multi-socket computing system 100 and/or any components therein.

As shown in FIG. 5, the computing system 500 can include a processor 510, a memory 520, a storage device 530, and input/output devices 540. The processor 510, the memory 520, the storage device 530, and the input/output devices 540 can be interconnected via a system bus 550. The processor 510 is capable of processing instructions for execution within the computing system 500. Such executed instructions can implement one or more components of, for example, the multi-socket computing system 100 and/or the like. In some implementations of the current subject matter, the processor 510 can be a single-threaded processor. Alternately, the processor 510 can be a multi-threaded processor. The processor 510 is capable of processing instructions stored in the memory 520 and/or on the storage device 530 to display graphical information for a user interface provided via the input/output device 540.

The memory 520 is a computer readable medium such as volatile or non-volatile that stores information within the computing system 500. The memory 520 can store data structures representing configuration object databases, for example. The storage device 530 is capable of providing persistent storage for the computing system 500. The storage device 530 can be a solid-state device, a floppy disk device, a hard disk device, an optical disk device, a tape device, and/or any other suitable persistent storage means. The input/output device 540 provides input/output operations for the computing system 500. In some implementations of the current subject matter, the input/output device 540 includes a keyboard and/or pointing device. In various implementations, the input/output device 540 includes a display unit for displaying graphical user interfaces.

According to some implementations of the current subject matter, the input/output device 540 can provide input/output operations for a network device. For example, the input/output device 540 can include Ethernet ports or other networking ports to communicate with one or more wired and/or wireless networks (e.g., a local area network (LAN), a wide area network (WAN), the Internet).

In some implementations of the current subject matter, the computing system 500 can be used to execute various interactive computer software applications that can be used for organization, analysis and/or storage of data in various (e.g., tabular) format (e.g., Microsoft Excel®, and/or any other type of software). Alternatively, the computing system 500 can be used to execute any type of software applications. These applications can be used to perform various functionalities, e.g., planning functionalities (e.g., generating, managing, editing of spreadsheet documents, word processing documents, and/or any other objects, etc.), computing functionalities, communications functionalities, etc. The applications can include various add-in functionalities or can be standalone computing products and/or functionalities. Upon activation within the applications, the functionalities can be used to generate the user interface provided via the input/output device 540. The user interface can be generated and presented to a user by the computing system 500 (e.g., on a computer screen monitor, etc.).

One or more aspects or features of the subject matter described herein can be realized in digital electronic circuitry, integrated circuitry, specially designed ASICs, field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example, as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including acoustic, speech, or tactile input. Other possible input devices include touch screens or other touch-sensitive devices such as single or multi-point resistive or capacitive track pads, voice recognition hardware and software, optical scanners, optical pointers, digital image capture devices and associated interpretation software, and the like.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. For example, the logic flows may include different and/or additional operations than shown without departing from the scope of the present disclosure. One or more operations of the logic flows may be repeated and/or omitted without departing from the scope of the present disclosure. Other implementations may be within the scope of the following claims.

What is claimed is:

1. A system, comprising:
   at least one data processor; and
   at least one memory storing instructions, which when executed by the at least one data processor, result in operations comprising:
   accessing, by a first thread executing a first task at a first node in a multi-socket computing system, a first data structure to obtain a first calibration dataset for the first node;
   generating, based at least on the first calibration dataset and a first quantity of time measured by a first clock at the first node, a first timestamp;
   recalibrating, by the first thread, the first clock at the first node, the recalibrating includes generating, based at least on the first quantity of time measured by the first clock and a second quantity of time measured by a wall clock of an operating system of the multi-socket computing system, a second calibration dataset; and
   updating the first data structure to include the second calibration dataset for the first node.

2. The system of claim 1, wherein the first thread obtains a lock prior to updating the first data structure, and wherein the lock prevents a second thread from simultaneously updating the first data structure.

3. The system of claim 1, wherein the first timestamp is generated at a start of the first task, and wherein a real time duration of the first task is determined based at least on the first timestamp and a second timestamp generated at an end of the first task.

4. The system of claim 1, wherein the second calibration dataset describes a relationship between the second quantity of time measured by the wall clock and the first quantity of time.

5. The system of claim 1, wherein the first quantity of time is in a first unit of time comprising a quantity of central processing unit (CPU) ticks, and wherein the second quantity of time is in a second unit of time comprising a quantity of nanoseconds.

6. The system of claim 1, wherein the first thread performs the recalibration at a time determined as part of a previous recalibration of the first clock, and wherein a calibration interval between successive recalibrations increases until a threshold value.

7. The system of claim 1, further comprising:
   generating a second timestamp subsequent to generating the first timestamp;
   determining whether the second timestamp is less than the first timestamp; and
   returning wherein the first timestamp instead of the second timestamp in response to the second timestamp being less than the first timestamp.

8. The system of claim 1, wherein the first data structure further includes a third calibration dataset for a second node in the multi-socket computing system.

9. The system of claim 1, wherein the first data structure comprises an array storing the first calibration dataset and/or the second calibration dataset, and wherein the first calibration dataset and/or the second calibration dataset are associated with a socket identifier of the first node.

10. The system of claim 2, further comprising:
    accessing, by the second thread executing a second task at the first node, a second data structure to obtain the first calibration dataset for the first node; and
    generating, by the second thread, a second timestamp generated based at least on the first calibration dataset and a third quantity of time measured by the first clock at the first node.

11. The system of claim 10, further comprising:
    recalibrating, by the second thread, the first clock at the first node by at least determining, a third calibration dataset; and
    updating a second data structure instead of the first data structure to include the third calibration dataset for the first node.

12. The system of claim 10, wherein the second thread accesses the second data structure while the first thread is updating the first data structure to include the second calibration dataset.

13. A computer-implemented method, comprising:
accessing, by a first thread executing a first task at a first node in a multi-socket computing system, a first data structure to obtain a first calibration dataset for the first node;
generating, based at least on the first calibration dataset and a first quantity of time measured by a first clock at the first node, a first timestamp;
recalibrating, by the first thread, the first clock at the first node, the recalibrating includes generating, based at least on the first quantity of time measured by the first clock and a second quantity of time measured by a wall clock of an operating system of the multi-socket computing system, a second calibration dataset; and
updating the first data structure to include the second calibration dataset for the first node.

14. The method of claim 13, wherein the first thread obtains a lock prior to updating the first data structure, and wherein the lock prevents a second thread from simultaneously updating the first data structure.

15. The method of claim 13, wherein the first timestamp is generated at a start of the first task, and wherein a real time duration of the first task is determined based at least on the first timestamp and a second timestamp generated at an end of the first task.

16. The method of claim 13, wherein the second calibration dataset describes a relationship between the second quantity of time measured by the wall clock and the first quantity of time, wherein the first quantity of time is in a first unit of time comprising a quantity of central processing unit (CPU) ticks, and wherein the second quantity of time is in a second unit of time comprising a quantity of nanoseconds.

17. The method of claim 13, wherein the first thread performs the recalibration at a time determined as part of a previous recalibration of the first clock, and wherein a calibration interval between successive recalibrations increases until a threshold value.

18. The method of claim 13, further comprising:
generating a second timestamp subsequent to generating the first timestamp;
determining whether the second timestamp is less than the first timestamp; and
returning wherein the first timestamp instead of the second timestamp in response to the second timestamp being less than the first timestamp.

19. The method of claim 14, further comprising:
accessing, by the second thread executing a second task at the first node, a second data structure to obtain the first calibration dataset for the first node, the second thread accessing the second data structure while the first thread is updating the first data structure to include the second calibration dataset;
generating, by the second thread, a second timestamp based at least on the first calibration dataset and a third quantity of time measured by the first clock at the first node;
recalibrating, by the second thread, the first clock at the first node by at least determining, a third calibration dataset; and
updating a second data structure instead of the first data structure to include the third calibration dataset for the first node.

20. A non-transitory computer readable medium storing instructions, which when executed by at least one data processor, result in operations comprising:
accessing, by a first thread executing a first task at a first node in a multi-socket computing system, a first data structure to obtain a first calibration dataset for the first node;
generating, based at least on the first calibration dataset and a first quantity of time measured by a first clock at the first node, a first timestamp;
recalibrating, by the first thread, the first clock at the first node, the recalibrating includes generating, based at least on the first quantity of time measured by the first clock and a second quantity of time measured by a wall clock of an operating system of the multi-socket computing system, a second calibration dataset; and
updating the first data structure to include the second calibration dataset for the first node.

* * * * *